(12) United States Patent
Meux et al.

(10) Patent No.: US 8,328,575 B2
(45) Date of Patent: Dec. 11, 2012

(54) SYSTEM FOR MULTIPLE CONNECTION OF PLUG-IN SWITCHGEAR DEVICES AND SWITCHGEAR DEVICE DESIGNED TO BE CONNECTED TO SAID SYSTEM

(75) Inventors: Dominique Meux, Valence (FR); Morgan Verdier, Valence (FR)

(73) Assignee: Crouzet Automatismes, Valence (FR)

( * ) Notice: Subject to any disclaimer, the term of this patent is extended or adjusted under 35 U.S.C. 154(b) by 203 days.

(21) Appl. No.: 12/662,829

(22) Filed: May 5, 2010

(65) Prior Publication Data

US 2010/0296229 A1  Nov. 25, 2010

(30) Foreign Application Priority Data

May 19, 2009  (FR) ..................................... 09 02449

(51) Int. Cl.
*H01R 13/627* (2006.01)
(52) U.S. Cl. ......... 439/349; 439/271; 439/587; 361/634
(58) Field of Classification Search .................. 439/221, 439/716, 271, 349, 587, 281, 589; 361/634, 361/673
See application file for complete search history.

(56) References Cited

U.S. PATENT DOCUMENTS

| | | | | |
|---|---|---|---|---|
| 2,681,966 | A | | 6/1954 | Christensen .................. 200/168 |
| 4,998,890 | A | * | 3/1991 | Tuan .............................. 439/326 |
| 5,803,759 | A | * | 9/1998 | Griffith et al. ................ 439/274 |
| 5,859,580 | A | * | 1/1999 | Hashizawa et al. ........... 337/260 |
| 6,002,580 | A | | 12/1999 | LeVantine et al. ............ 361/634 |
| 6,317,311 | B1 | | 11/2001 | Middlehurst et al. ......... 361/637 |
| 8,094,436 | B2 | * | 1/2012 | Mills et al. .................... 361/636 |

FOREIGN PATENT DOCUMENTS

| | | |
|---|---|---|
| AU | 73 915/81 | 2/1982 |
| FR | 2 791 220 | 9/2000 |

* cited by examiner

*Primary Examiner* — Xuong Chung Trans
(74) *Attorney, Agent, or Firm* — Steptoe & Johnson LLP

(57) ABSTRACT

A device for connection of multiple switchgear devices having a first connection plane including at least one plug-in socket for receiving a switchgear device pluggable in a plug-in direction. The device includes a second protection plane with a removable cover having at least one opening for the control means of a device to pass through. The removable cover also includes at least a first pressing area for pressing against a second pressing area of at least one switchgear device, pressing of the first pressing area on the second pressing area at the time the removable cover is positioned providing a holding force for the at least one switchgear device.

9 Claims, 3 Drawing Sheets

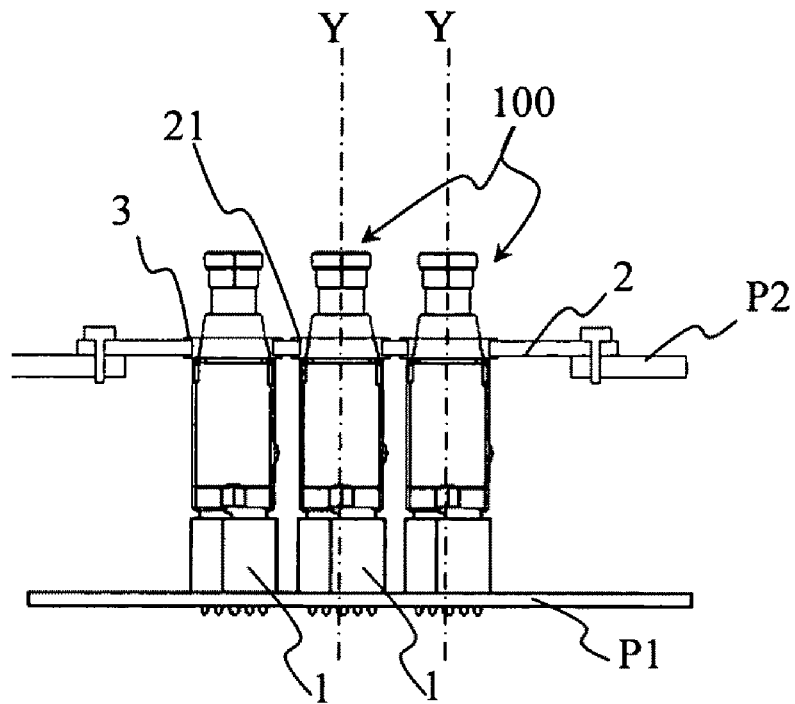
Fig. 3
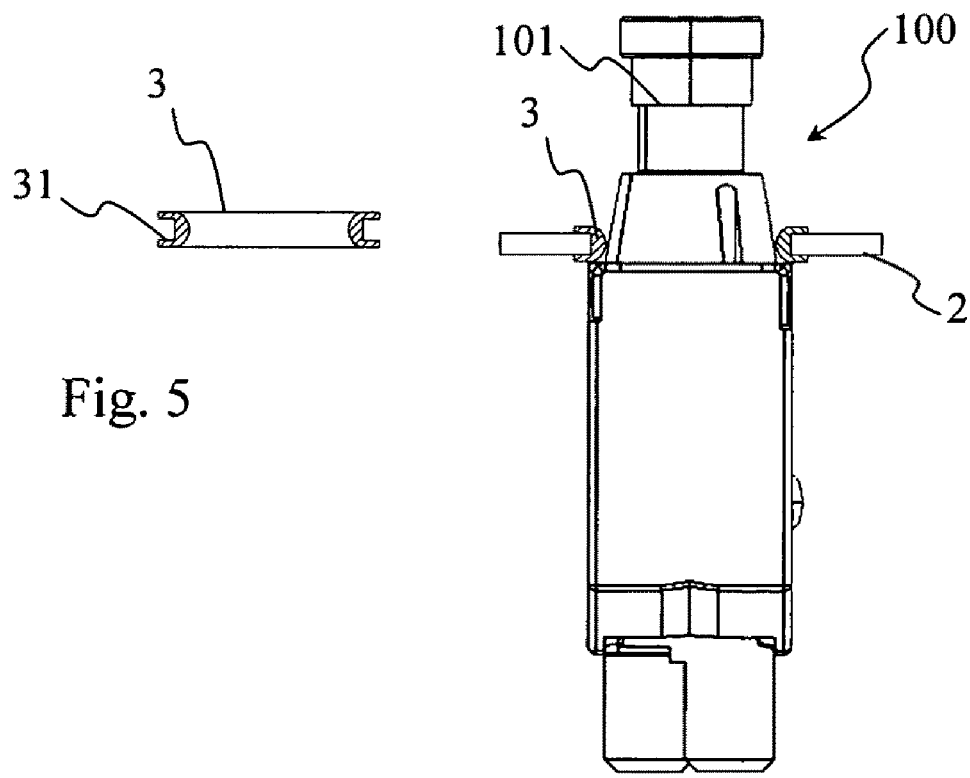
Fig. 5
Fig. 4

SYSTEM FOR MULTIPLE CONNECTION OF PLUG-IN SWITCHGEAR DEVICES AND SWITCHGEAR DEVICE DESIGNED TO BE CONNECTED TO SAID SYSTEM

BACKGROUND OF THE INVENTION

The invention relates to a system for multiple connection of switchgear devices for protection of a current line. Said system comprises a first connection plane comprising at least one plug-in socket designed to receive a switchgear device that is pluggable in a plug-in direction. Said system comprises a second protection plane comprising a removable cover provided with at least one opening for the control means of said switchgear device to pass through. Said removable cover comprises at least a first pressing area designed to press against a second pressing area of at least one switchgear device.

The invention also relates to a switchgear device designed to be connected to a plug-in socket of a multiple connection system according to the invention.

STATE OF THE PRIOR ART

The use of systems for multiple connection of electrical apparatus, in particular switchgear devices, is known. The purpose of the switchgear devices is to perform protection of current lines. As illustrated in U.S. Pat. No. 6,002,580 and U.S. Pat. No. 6,317,311, the multiple connection system comprises a connection plane comprising one or more plug-in sockets designed to respectively receive a switchgear device. The switchgear device or devices are pluggable in a plug-in direction. The switchgear devices can be connected to a connector via plug-in sockets. Certain connection systems comprise a cover enabling access to the switchgear devices to be protected. The cover preferably comprises openings respectively allowing free access to the opening and closing control means of the switchgear devices.

When connection systems are used in environments sensitive to vibrations, the switchgear devices may move in the plug-in sockets. Specific securing means would be indispensable to prevent any movement of the switchgear device in the plug-in direction and/or perpendicularly to the latter.

SUMMARY OF THE INVENTION

The object of the invention is therefore to remedy the shortcomings of the state of the art so as to propose a system for multiple connection of plug-in switchgear devices that is robust and can be used in an environment sensitive to vibrations.

The removable cover of the multiple connection system according to the invention comprises at least one intermediate buffer part positioned between said at least first and second pressing areas, the intermediate buffer part enabling a uniform distribution of a holding force over the whole set of switchgear devices at the time the removable cover is positioned on said at least one switchgear device in the plug-in socket.

Preferably, the intermediate buffer part is positioned on said at least first pressing area or on said at least second pressing area.

Advantageously, said at least one intermediate buffer part is made from deformable material.

Preferably, said holding force comprises a main component directed in the plug-in direction.

According to a preferred embodiment of development of the invention, said at least first pressing area is located on the periphery of each opening of the removable cover.

Advantageously, the periphery of each opening is cylindrical in shape and is designed to engage on a tapered shape of the second pressing area of a switchgear device to achieve progressive application of the holding force.

Preferably, the intermediate buffer part comprises a deformable O-ring.

Preferably, said at least one plug-in socket is connected to a power connector via at least one conductor comprising printed circuit tracks arranged on the first connection plane, said connector being connected to said printed circuit tracks.

A switchgear device designed to be connected to a plug-in socket of a multiple connection system as defined above comprises a second pressing area of tapered shape, said tapered shape being designed to press against the cylindrical first pressing area of the removable cover.

BRIEF DESCRIPTION OF THE DRAWINGS

Other advantages and features will become more clearly apparent from the following description of particular embodiments of the invention, given as non-restrictive examples only and represented in the accompanying drawings in which:

FIG. 3 represents a side view of a connection system according to FIG. 2;

FIG. 4 represents a switchgear device according to an embodiment of the invention;

FIG. 5 represents a detailed view of an intermediate buffer part designed for a switchgear device according to FIG. 4;

DETAILED DESCRIPTION OF AN EMBODIMENT

Figure 1:
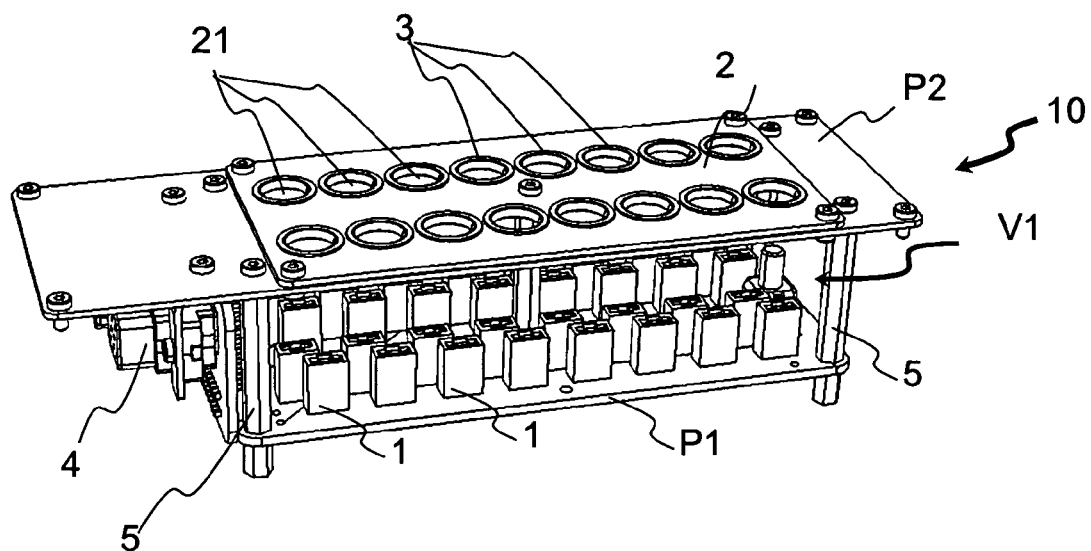
FIG. 1 represents a perspective view of a connection system according to a first preferred embodiment of the invention.

According to a preferred embodiment of the invention as represented in FIG. 1, the multiple connection system 10 comprises a first connection plane P1. The first connection plane comprises at least one plug-in socket 1 designed to receive a switchgear device 100. Said switchgear device 100 is designed for protection of a current line. Said device is designed to plug into the plug-in socket 1 in a plug-in direction Y.

Said at least one plug-in socket 1 is connected to a power connector 4 via at least one conductor. The conductor preferably comprises printed circuit tracks arranged on the first connection plane P1. The power connector 4 is connected to said printed circuit tracks.

Figure 2:
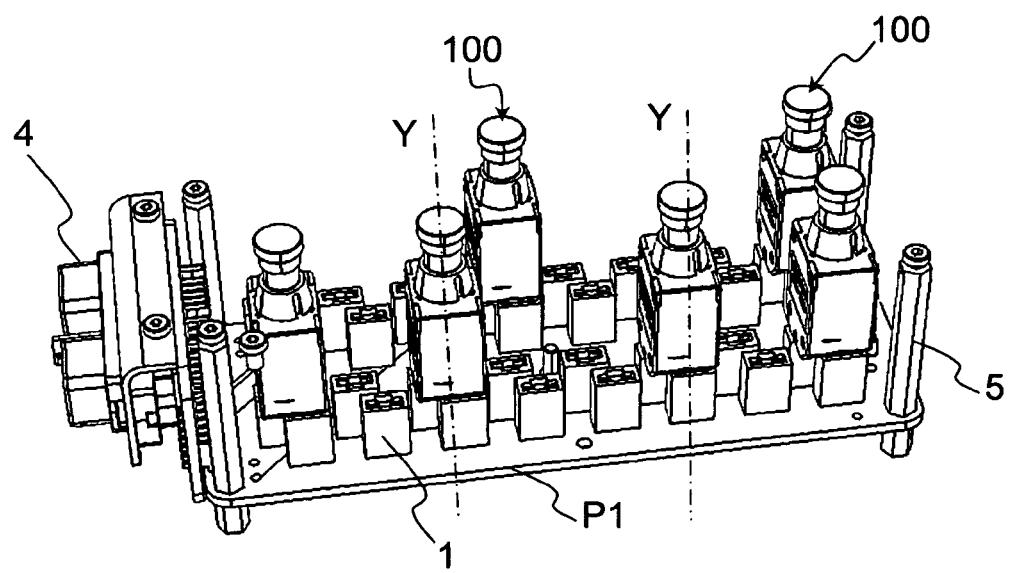
FIG. 2 represents a perspective view of a connection system according to a first preferred embodiment of the invention, in the course of assembly.

As an example embodiment as represented in FIG. 2, the first connection plane P1 comprises sixteen plug-in sockets 1.

The multiple connection system 10 comprises a second protection plane P2. The first connection plane P1 and the second protection plane P2 are separated from one another to define an internal connection volume V1. Said internal connection volume V1 is designed to receive the set of switchgear devices connected to the plug-in sockets. Access to the internal connection volume V1 is possible due to an access area provided in the second protection plane P2.

The second protection plane P2 comprises a removable cover 2 designed to close off said access area. The removable cover 2 is provided with at least one opening 21 for the control means 101 of a switchgear device 100 to pass through.

According to the embodiment of the invention represented in FIGS. 1 to 3, the second protection plane P2 is secured to the first connection plane via several spacers 5.

As an example embodiment as represented in FIG. 1, the removable cover 2 comprises sixteen openings 21.

The removable cover 2 comprises at least a first pressing area designed to press against a second pressing area of at least one switchgear device 100.

Bringing the first pressing area into contact on the second pressing area ensures a holding force Fm of said at least one switchgear device 100 in the plug-in socket 1. Contact of the first pressing area on the second pressing area is achieved when the removable cover 2 is positioned on the second protection plane P2, in other words when closing of the access area is performed.

The connection system 10 comprises at least one intermediate buffer part 3 positioned between said at least first and second pressing areas. The intermediate buffer part 3 enables a uniform distribution of the holding force Fm over the set of switchgear devices 100.

The intermediate buffer part 3 is secured on said at least first pressing area or on said at least second pressing area.

Said at least one intermediate buffer part 3 is preferably made from deformable material.

Application of the holding force Fm on the switchgear devices 100 enables said devices to be respectively securely held in the plug-in sockets to prevent any movement. When a connection system according to the invention is used in an airplane, the vibrations perceived in flight are no longer liable to cause disconnection of the switchgear devices 100.

According to a first preferred embodiment of the invention represented in FIGS. 1 to 5, said at least first pressing area is located on the periphery of each opening 21 of the removable cover 2. The periphery of each opening 21 is designed to engage on the second pressing area of the switchgear device 100.

The periphery of each opening 21 is preferably of cylindrical shape and is designed to engage on a tapered shape of the second pressing area of a switchgear device 100. The use of a tapered shape ensures a progressive application of the holding force Fm at the time the removable cover is positioned on the second protection plane P2.

As represented in FIG. 4, the intermediate buffer part 3 is positioned on said at least first pressing area. The intermediate buffer part preferably comprises a deformable O-ring. According to this development embodiment of the invention, the O-ring comprises a groove 31 designed to collaborate with the edge of the opening 21 of the removable cover 2.

Said holding force Fm then comprises a main component directed in the plug-in direction Y.

According to a second preferred embodiment of the invention, said at least first pressing area is located on the periphery of each opening 21 of the removable cover 2. The periphery of each opening 21 is designed to engage on the second pressing area of the switchgear device 100. The periphery of each opening 21 is preferably of cylindrical shape and is designed to engage on a tapered shape of the second pressing area of a switchgear device 100. The use of a tapered shape ensures a progressive application of the holding force Fm at the time the removable cover is positioned on the second protection plane P2.

As represented in FIG. 5, the intermediate buffer part 3 is positioned on said at least second pressing area of the switchgear device 100. Said holding force Fm then comprises a main component directed in the plug-in direction Y.

According to a third preferred embodiment of the invention, said at least first pressing area is located on the periphery of each opening 21 of the removable cover 2. The periphery of each opening 21 is designed to engage on the second pressing area of the switchgear device 100. The periphery of each opening 21 is preferably of cylindrical shape and is designed to engage on a cylindrical shape of the second pressing area of a switchgear device 100.

Figure 7:
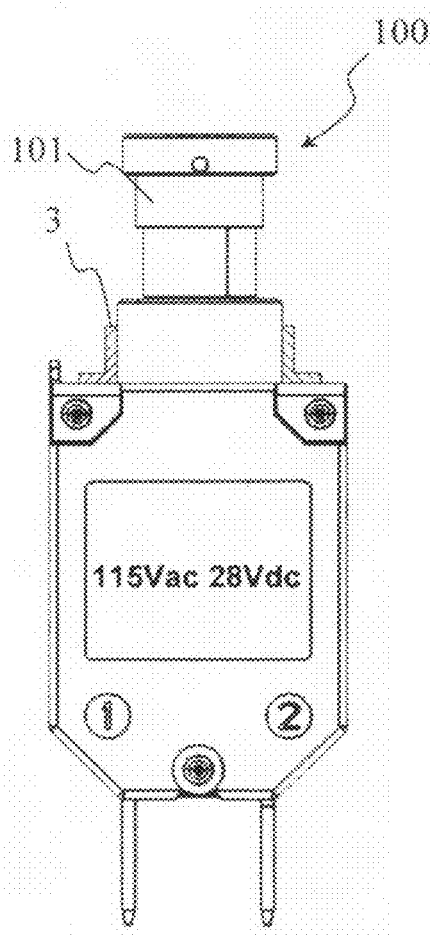

As represented in FIG. 7, the intermediate buffer part 3 is positioned on said at least first pressing area. Said holding force Fm then comprises a main component directed in the plug-in direction Y.

The invention also relates to a switchgear device designed to be connected to a plug-in socket of a multiple connection system as described above. The switchgear device according to the invention comprises a second pressing area having a suitable shape to come into contact with a first pressing area of a removable cover.

According to a particular embodiment of the invention, the second pressing area of the switchgear device 100 comprises a tapered shape, said tapered shape being designed to press against a cylindrical first pressing area of the removable cover 2.

Figure 6:
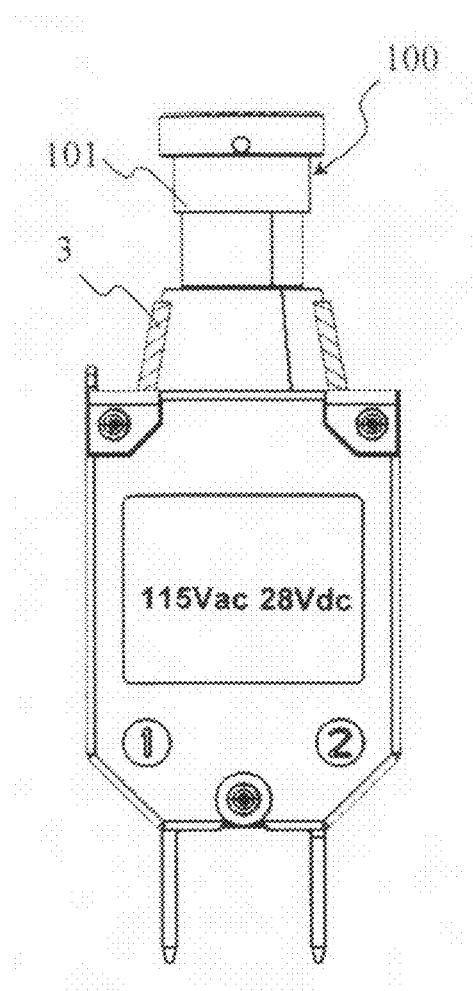
FIGS. 6 and 7 represent views of switchgear devices according to particular embodiments of the invention.

According to a second particular embodiment of the invention as represented in FIG. 6, the second pressing area of the switchgear device 100 comprises a tapered shape designed to press against the cylindrical first pressing area of the removable cover. The tapered shape is covered by an intermediate buffer part 3.

According to another particular embodiment of the invention as represented in FIG. 7, the second pressing area of the switchgear device comprises a cylindrical shape designed to press against the cylindrical first pressing area of the removable cover. The cylindrical shape is covered by an intermediate buffer part 3. According to this particular embodiment, the intermediate buffer part 3 preferably extends over the switchgear device beyond the cylindrical area.

The invention claimed is:

1. A device for connection of multiple switchgear devices for protection of a current line, said device comprising:
    a first connection plane comprising at least one plug-in socket for receiving a switchgear device engaging in a plug-in direction;
    a second protection plane comprising a removable cover having at least one opening therethrough for a control means of said switchgear device to pass through;
    said removable cover comprising at least a first pressing area for pressing against a second pressing area of at least one switchgear device,
    the connection device further comprising at least one intermediate buffer part positioned between said at least first and second pressing areas, the intermediate buffer part enabling a uniform distribution of a holding force over one or more switchgear devices at the time the removable cover is positioned on said at least one switchgear device in a plug-in socket.

2. The device according to claim 1, wherein the intermediate buffer part is positioned on said at least one of said first and second pressing areas.

3. The device according to claim 1, wherein said at least one intermediate buffer part comprises deformable material.

4. The device according to claim 1, wherein said main component directed in the plug-in direction is for providing said holding force.

5. The device according to claim 1, wherein said at least first pressing area is located on the periphery of each opening of the removable cover.

6. The device according to claim 5, wherein the periphery of each opening is of cylindrical shape for engaging a tapered shape of the second pressing area of a switchgear device for progressive application of holding force.

7. The device according to claim 6, wherein the intermediate buffer part comprises a deformable O-ring.

8. The device according to claim 1, wherein said at least one plug-in socket is connected to a power connector via at least one conductor comprising printed circuit tracks on the first connection plane, said connector being connected to said printed circuit tracks.

9. A switchgear device for connection to a plug-in socket of a multiple connection system according to claim 6, comprising a second pressing area of tapered shape, said tapered shape for pressing against the cylindrical first pressing area of the removable cover.

* * * * *